United States Patent [19]

Messalem et al.

[11] Patent Number: 4,997,567

[45] Date of Patent: Mar. 5, 1991

[54] ION-EXCHANGE MEMBRANES AND PROCESSES FOR THE PREPARATION THEREOF

[75] Inventors: Rami Messalem, Omer; Chaim Forgacs; Emanuel Korngold, both of Beer Sheva, all of Israel

[73] Assignee: Ben-Gurion University of the Negev Research and Development Authority, Beer Sheva, Israel

[21] Appl. No.: 754,437

[22] Filed: Jul. 12, 1985

[30] Foreign Application Priority Data

Jul. 25, 1984 [IL] Israel .................................... 72506

[51] Int. Cl.$^5$ ........................................... B01C 69/00
[52] U.S. Cl. ............................. 210/490; 210/500.36; 427/245
[58] Field of Search ............... 427/244, 245; 204/296; 210/500.2, 507, 500.36, 490

[56] References Cited

U.S. PATENT DOCUMENTS 3,753,712 8/1973 Janneck et al. ............. 210/500.2 X
4,115,303 9/1978 Marchand et al. .......... 40/500.36 X

FOREIGN PATENT DOCUMENTS 0104619 8/1980 Japan .................................. 210/507

Primary Examiner—Frank Spear
Attorney, Agent, or Firm—Fleit, Jacobson, Cohn, Price, Holman & Stern

[57] ABSTRACT

The invention provides ion exchange membranes comprising an activated polymeric matrix incorporating fixed anionic and/or cationic groups characterized by an integral network of an inert unactivated polymer providing augmented dimensional stability to the membrane and processes for the preparation thereof.

9 Claims, No Drawings

ION-EXCHANGE MEMBRANES AND PROCESSES FOR THE PREPARATION THEREOF

The present invention relates to ion-exchange membranes and processes for the preparation thereof. More specifically, the present invention relates to the production of ion-exchange membranes of improved dimensional stability.

Ion exchange membranes, which are used in electrodialysis and other membrane processes usually comprise a polymeric matrix with covalently bonded ionic groups. These membranes may be homogenous or heterogenous (being a mixture of resin, binder and reinforcing nets) and a wide spectrum of polymers and ionic groups are known to serve in these membranes.

A good ion-exchange membrane is characterized by high ion-exchange capacity, high permselectivity, low ionic resistance, low salt leakage, good thermal and chemical stability and good dimensional stability. Dimensional stability means that dimensional changes in the membrane, when the membrane is transferred from wet form to dry form, from one ionic form to another or from solutions of one concentration to another, are kept minimal.

To appreciate the particular importance of the dimensional stability one has to understand that the membranes are usually utilized as components in electrodialysis stacks, in which distribution of solutions and alignment and tightening of the units are achieved by means of cuts and holes in the membranes. In membranes of poor dimensional stability, the relative location of these cuts and holes can not be kept constant and so the desired construction of a leakproof stack is virtually impossible, especially since these units have to be regularly opened for service.

In Israel Patent 14720 Korosy and Shorr describe a process for preparing homogeneous ion-exchange membranes based on polyethylene which membranes excel in all the important characteristics except dimensional stability.

Said Patent teaches and claims a process for the production of anion or cation permselective membranes or ion exchange material, which are substantially insoluble in aqueous solutions, which comprises effecting chlorosulfonation of a polyolefin in the appropriate form (sheet, granule or powder) by reacting with a suitable agent, such as sulfuryl chloride or a mixture of sulfur dioxide and chlorine in heterogeneous reaction and subjecting the substantially water insoluble sulfochlorinated polyolefin to hydrolysis, aminolysis, esterification or other reactions introducing free basic groups, depending on the ion-exchange activity desired.

Korosy et al subsequently tried to overcome this problem of poor and unsatisfactory dimensional stability by modifying said process to achieve better uniformity across the cross-section and advantageous mechanical properties such as increased elasticity as described in Israel Patent 26598.

In said Patent there is described the improved process of first preparing a solution of a film forming polyolefin, which is subjected to a process of sulfochlorination so as to introduce a predetermined quantity of sulfur, say between about 4 to 8 percent by weight calculated on the polyolefin. From this sulfochlorinated polyolefin a film is formed, either by casting from the solution by known methods to form a film of predetermined thickness and drying the latter, or by isolating the solid sulfochlorinated polyolefin by precipitating it from its solution or by evaporating its solvent and then extruding or rolling, and where desired, calendering the sulfochlorinated polyolefin to a sheet. The cast or rolled sheets of sulfochlorinated polyolefin are then converted either into a cation-selective membrane by hydrolysis or into an anion selective membrane by introducing in place of the chlorine atom of the sulfochloride group organic groups containing free basic groups.

The membranes thus obtained are indeed dimensionally stable but their other properties are inferior to those of the kind produced by the process of Israel Patent 14720.

It is therefore an object of the present invention to prepare an improved membrane combining the performance properties of those produced by Israel Patent 14720 with augmented dimensional stability.

According to the present invention, this improvement is achieved by incorporating a pattern of unactivated polymer material into the membrane. This network of unactivated material will not swell in solution and will keep the dimension of the membrane constant under any conditions.

Thus the present invention provides an ion exchange membrane comprising an activated polymeric matrix incorporating fixed anionic and/or cationic groups characterized by an integral network of an inert unactivated polymer providing augmented dimensional stability to the membrane.

In preferred embodiments of the present invention as described hereinafter for illustrative purposes there is provided an ion exchange membrane comprising an activated polyolefin matrix incorporating fixed anionic and/or cationic groups characterized by an integral network of an inert unactivated polyolefin providing augmented dimensional stability to the membrane, however it is to be noted that photochemical sulfochlorination reactions can be used to introduce sulfonyl chloride groups into other polymers such as polysulfones, polyesters, perfluoropolyolefins, etc. and therefore the processes of the present invention are also applicable to such polymeric groups by methods known in the art and based on the present disclosure. Therefore, ion-exchange membranes formed with such polymers are also included within the scope of the present invention.

Several methods for producing the improved membranes of the present invention are contemplated and provided herein.

Thus, e.g., it is well known that high density polyethylene (HDPE) and Polypropylene (PP) are not attacked as readily during photochemical sulfochlorination as Low density polyethylene (LDPE), and therefore when a PP or HDPE network is fused with a LDPE sheet prior to the sulfochlorination reaction the resulting membrane will contain active patches of membrane material separated by unreacted polyolefin strips.

Similarly, since ionic groups are introduced into the polymeric matrix by hydrolysis or other chemical reaction of the $SO_2Cl$ groups introduced into the polymer by photochemical sulfochlorination, the absence of illumination in certain parts of the LDPE sheet will keep these parts unaffected. Thus, if illumination is obstructed in a network type pattern in the resulting membrane, this pattern will remain inert and non-swelling and will ensure the dimensional stability of the membrane.

In light of, and in accordance with the above, the present invention provides a process for preparing an ion exchange membrane containing an inert network of unactivated polyethylene in its structure comprising fusing a high density polyethylene network with a low density polyethylene sheet, prior to the conversion of said low density polyethylene to polyethylene sulfochloride.

Alternatively, the present invention provides a process for preparing an ion exchange membrane containing an inert network of unactivated polypropylene in its structure comprising fusing a polypropylene network with a low density polyethylene prior to the conversion of said low density polyethylene to polyethylene sulfonylchloride.

In another aspect of the present invention there is provided a process for preparing an ion exchange membrane as claimed comprising shadowing parts of a low density polyethylene sheet during photochemical sulfochlorination thereof.

In a preferred embodiment of said latter process said shadowing is obtained by first incompletely laminating the polyethylene sheet with a colored network of high density polyethylene or polypropylene which is then separated from the film following the sulfochlorination thereof while in another embodiment said shadowing is obtained by painting or printing a pattern of dark lines on one or both sides of the low density polyethylene film prior to the photo-chemical sulfochlorination thereof.

Following the above procedures, preferred embodiments of ion exchange membranes according to the present invention comprise an activated polyolefin matrix incorporating fixed anionic and/or cationic groups characterized by an integral network of an inert unactivated polyolefin providing augmented dimensional stability to the membrane having thus been prepared in the form of a laminate consisting of one layer of a high density polyethylene or polypropylene network and one layer of low density activated polyethylene fused together as well as in the form of a laminate comprising a network of high density polyethylene or polypropylene fused between two layers of activated low density polyethylene.

While the invention will now be described in connection with certain preferred embodiments in the following examples it will be understood that it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

One sheet of low-density polyethylene, of 50 micron thickness (20×30 cm) was laminated to a black net of high-density polyethylene. The holes in the net are 5×5 mm rectangular, and the thickness of the fiber net was 2 mm. The lamination was carried out using a hot press (4 atm and 60° C.) for 10 minutes. The laminate was photochemically sulfonated, according to the procedure of Korosy et al. (Israeli Patent No. 14720 and British Patent No. 981562) and then hydrolized, resulting in a highly permselective and dimensionally stable cation-exchange membrane in the exposed area. After completion of the hydrolysis, the HDPE net was separated from the film, exposing a network of unreacted polyethylene which was integrated in the matrix of the cation-exchange membrane. A highly permselective and dimensionally stable membrane with resistance of 3 ohm cm$^2$ was obtained.

EXAMPLE 2

A sulfochlorinated polyethylene sheet was prepared according to Example 1. Then it was treated with a diamine and quaternized, following Korosy's procedure, resulting in a highly perm-selective and dimensionally stable anion-membrane.

EXAMPLE 3

A sulfochlorinated cation exchange membrane was prepared according to Example 1, only here the film of low density-polyethylene was laminated to a net of high density, nonwoven polyethylene and the fusion was complete with the laminate not being separated as in Example 1.

EXAMPLE 4

A cation exchange membrane was obtained as in Example 3 only here two films of low density polyethylene were sandwiched and laminated to the net.

EXAMPLE 5

A roll of low density polyethylene film was printed with black printing paint, using standard plastic printing equipment the thickness of the film was 50 microns. The print was of a grid with horizontal and vertical lines separated every 5 mm. The roll was then photochemically treated in a continuous sulfochlorination reactor. A piece of the polyethylene sulfonyl chloride (50×100 cm) was then hydrolized, resulting in a dimensionally stable cation-exchange membrane.

EXAMPLE 6

A piece of the polyethylene sulfonyl chloride (50×100 cm), as in Example 5, was treated with a diamine and quaternized, resulting in a highly permselectivity and dimensionally stable anion-exchange membrane.

It will be evident to those skilled in the art that the invention is not limited to the details of the foregoing illustrative examples and that the present invention may be embodied in other specific forms without departing from the essential attributes thereof, and it is therefore desired that the present examples be considered in all respects as illustrative and not restrictive, reference being made to the appended claims, rather than to the foregoing description, and all changes which come with the meaning and range of equivalency of the claims are therefore intended to be embraced therein.

What is claimed is:

1. A permselective, dimensionally stable ion exchange membrane which selectively separates ions of opposite electric charges passing therethrough, said membrane being an activated polymeric film matrix incorporating fixed anionic and/or cationic groups characterized by an integral network of an inert unactivated polymeric film providing augmented dimensional stability to the membrane.

2. A permselective, dimensionally stable ion exchange membrane according to claim 1, comprising an activated polyolefin film matrix characterized by an integral network of an inert unactivated polyolefin film providing augmented dimensional stability to the membrane.

3. A permselective, dimensionally stable ion exchange membrane according to claim 1, comprising a laminate consisting of one layer of a network of high density polyethylene film or polypropylene film and one layer of film of low density activated polyethylene fused together.

4. A laminated membrane according to claim 3, comprising a network of high density polyethylene film or polypropylene film used between two layers of activated low density polyethylene film.

5. A process for preparing the permselective dimensionally stable ion exchange membrane of claim 1 that contains an inert network of unactivated polyethylene film in its structure, comprising fusing a film of a high density polyethylene network with a low density polyethylene sheet; and converting said low density polyethylene to polyethylene sulfochloride.

6. A process for preparing the permselective dimensionally stable ion exchange membrane of claim 1 that contains an inert network of unactivated polyethylene film in its structure, comprising fusing a network of a high density polyethylene network with a low density polyethylene sheet; and converting said low density polyethylene to polyethylene sulfonylchloride.

7. The process of claim 5, further comprising shadowing parts of said low density polyethylene film during said sulfochlorination thereof.

8. A process according to claim 7, wherein the shadowing is obtained by first incompletely laminating the polyethylene film with a colored network of high density polyethylene film or polypropylene which is then separated from the low density polyethylene film following the sulfochlorination thereof.

9. A process according to claim 7, wherein the shadowing is obtained by painting or printing a pattern of dark lines on one or both sides of the low density polyethylene film prior to the sulfochlorination thereof.

* * * * *